United States Patent
Amurri et al.

(10) Patent No.: US 10,482,588 B2
(45) Date of Patent: Nov. 19, 2019

(54) METHOD AND APPARATUS FOR CONTROLLING PRODUCTION AND FEEDING OF SEMIFINISHED PRODUCTS IN A TYRE BUILDING PROCESS

(71) Applicant: PIRELLI TYRE S.P.A., Milan (IT)

(72) Inventors: Cesare Emanuele Amurri, Milan (IT); Davide Lupo Conti, Milan (IT); Ivan Gildo Boscaino, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 383 days.

(21) Appl. No.: 15/522,237

(22) PCT Filed: Oct. 27, 2015

(86) PCT No.: PCT/IB2015/058263
§ 371 (c)(1),
(2) Date: Apr. 26, 2017

(87) PCT Pub. No.: WO2016/067190
PCT Pub. Date: May 6, 2016

(65) Prior Publication Data
US 2017/0337674 A1 Nov. 23, 2017

(30) Foreign Application Priority Data

Oct. 29, 2014 (IT) .............................. MI2014A1859

(51) Int. Cl.
*G06T 7/00* (2017.01)
*B29D 30/00* (2006.01)
*G06T 7/90* (2017.01)

(52) U.S. Cl.
CPC ........ *G06T 7/0004* (2013.01); *B29D 30/0016* (2013.01); *G06T 7/90* (2017.01);
(Continued)

(58) Field of Classification Search
CPC .............................. G06T 7/0004; G06T 7/90
See application file for complete search history.

(56) References Cited

U.S. PATENT DOCUMENTS

| | | | | |
|---|---|---|---|---|
| 2,120,381 A | * | 6/1938 | Troxell | G01N 3/08 250/215 |
| 2004/0057600 A1 | * | 3/2004 | Niwa | B60R 25/104 382/103 |

(Continued)

FOREIGN PATENT DOCUMENTS

| | | |
|---|---|---|
| EP | 2 602 763 A1 | 6/2013 |
| EP | 2 690 597 A2 | 1/2014 |

(Continued)

OTHER PUBLICATIONS

Russian Office Action dated Jun. 13, 2018, from the Federal Service for Intellectual Property, in counterpart Russian Application No. 2017118276.

(Continued)

*Primary Examiner* — Chan S Park
*Assistant Examiner* — Mai H Tran
(74) *Attorney, Agent, or Firm* — Finnegan, Henderson, Farabow, Garrett & Dunner, L.L.P.

(57) ABSTRACT

An apparatus and a method to control manufacturing and feeding of semifinished products in a tyre building process, includes detecting at least one first image representative of a semifinished product; dividing the at least one first image into a plurality of first sub-parts, wherein each one of first sub-parts is composed of a plurality of first portions, each one associated with a respective brightness value; defining a first threshold for the brightness values; making a first comparison between the brightness values of the first portions and the first threshold; as a function of the first comparison, determining for each one of the first sub-parts a first operative parameter representative of a total area (Continued)

occupied in each first sub-part by the first portions associated with a brightness value smaller or greater than the first threshold; making a second comparison between each one of the first operative parameters and a second threshold; and causing the generation of a first notification signal as a function of said second comparison.

49 Claims, 7 Drawing Sheets

(52) U.S. Cl.
CPC ............... *B29D 2030/0066* (2013.01); *G06T 2207/20021* (2013.01); *G06T 2207/30108* (2013.01)

(56) References Cited

U.S. PATENT DOCUMENTS

2008/0226156 A1* 9/2008 Ota .................... G01R 31/2836
382/141

2013/0147947 A1* 6/2013 Terreno ................. G06T 7/0004
348/135
2014/0341460 A1* 11/2014 Ballabio ............. G01M 17/027
382/141

FOREIGN PATENT DOCUMENTS

| RU | 2120381 | 10/1998 |
| RU | 2258608 | 8/2005 |
| RU | 2291780 | 1/2007 |
| WO | WO 2010/038223 A1 | 4/2010 |
| WO | WO 2012/085632 A1 | 6/2012 |

OTHER PUBLICATIONS

International Search Report form the European Patent Office in corresponding International Application No. PCT/IB2015/058263 dated Mar. 29, 2016.
Written Opinion of the International Searching Authority from the European Patent Office in corresponding International Application No. PCT/IB2015/058263, dated Mar. 29, 2016.

* cited by examiner

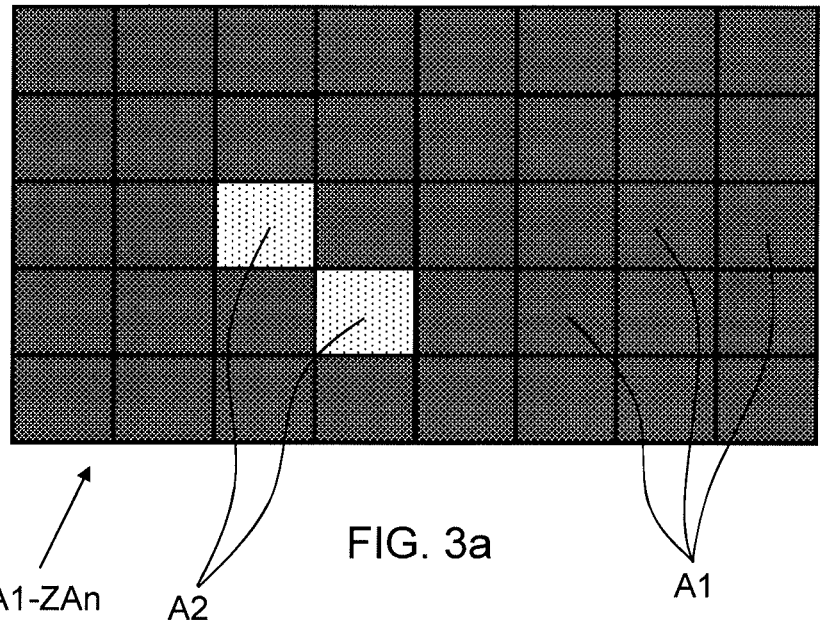
FIG. 3a
ZA1-ZAn   A2                        A1
FIG. 3b
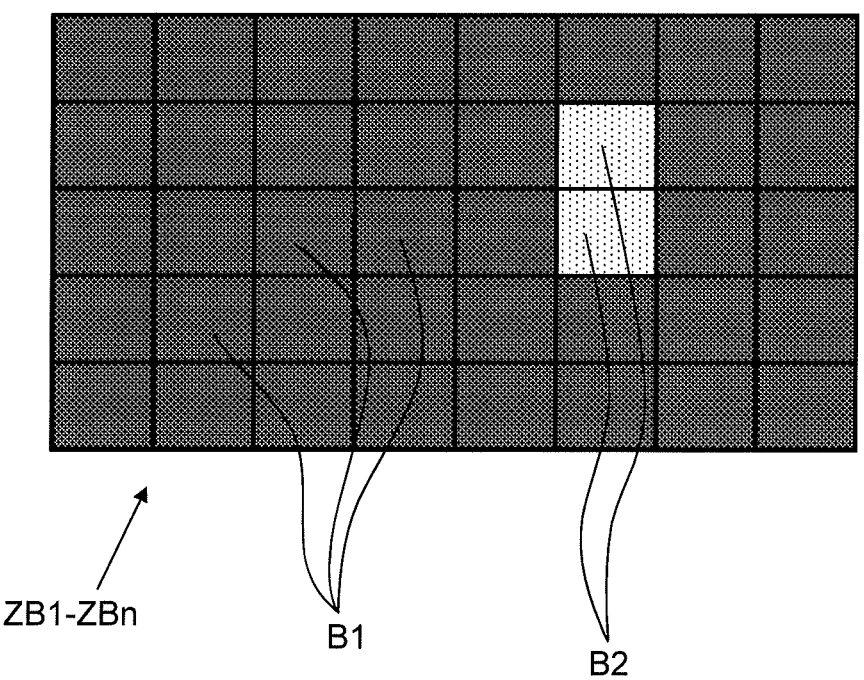
ZB1-ZBn   B1      B2

METHOD AND APPARATUS FOR CONTROLLING PRODUCTION AND FEEDING OF SEMIFINISHED PRODUCTS IN A TYRE BUILDING PROCESS

CROSS REFERENCE TO RELATED APPLICATIONS

This application is a national phase application based on PCT/IB2015/058263, filed Oct. 27, 2015, which claims the priority of Italian Patent Application No. MI2014A001859, filed Oct. 29, 2014, the content of each application being incorporated herein by reference.

BACKGROUND OF THE INVENTION

Field of the Invention

The present invention relates to a method for controlling production and feeding of semifinished products in a tyre building process.

The present invention further relates to an apparatus for controlling production and feeding of semifinished products in a tyre building process.

Description of the Related Art

A tyre for vehicle wheels generally comprises a carcass structure including at least one carcass ply having respectively opposite terminal edges in engagement with respective annular anchoring structures, generally referred to as "bead cores", identified in the regions usually referred to as "beads", the inside diameter of which substantially matches a so-called "fitting diameter" of the tyre on a respective rim. The tyre also comprises a crown structure including a belt structure having at least one belt strip located in a radially external position relative to the carcass ply/ies, and a tread band which is radially external to the belt strip/s. Between the tread band and the belt strip/s a so-called "underlayer" of elastomeric material may be interposed, the properties of which are suitable for ensuring a stable coupling between the belt strip/s and the tread band. In addition, respective sidewalls of elastomeric material are applied to the side surfaces of the carcass structure, each extending from one of the side edges of the tread band up to the respective annular bead anchoring structure. In tyres of the "tubeless" type, the carcass ply is internally covered with a layer of elastomeric material, preferably a butyl-based elastomeric material, commonly referred to as "liner", which has optimal air tightness properties and extends from one bead to the other.

The term "elastomeric material" refers to a compound comprising at least one elastomeric polymer and at least one reinforcing filler. Preferably, said compound also comprises additives such as, for example, a cross-linking agent and/or a plasticizer. Thanks to the presence of the cross-linking agent, said material can be reticulated by heating so as to form the final product.

The term "semifinished product" refers to a continuous elongated element having a flat cross-section, made of elastomeric material, and embedding one or more reinforcing cords, preferably textile or metallic ones, disposed parallel to each other in the longitudinal direction of the elongated element itself.

The term "elementary semifinished product" refers to a section cut to size of said semifinished product; said elementary semifinished product will be hereafter referred to as "strip-like element".

The term "minimum brightness value", in digital black and white detection, is to be understood as that brightness value which is attributed to the pixel of a digital image when substantially no photon is striking the corresponding pixel of the detection device in use.

In colour detection, said minimum brightness value corresponds to the brightness value attributed to the sensor/s (e.g. a set of three sensors) associated with the same pixel, when substantially no photon is striking said sensor or each one of said sensors. In case of multiple sensors associated with the same pixel, each one may be dedicated, for example, to detecting a respective fundamental chromatic component of the light striking that pixel.

The term "maximum brightness value", in digital black and white detection, is to be understood as that brightness value which is attributed to the pixel of a digital image when the number of photons striking the corresponding pixel of the detection device in use is the maximum number that said corresponding pixel can receive, i.e. the number of photons which can saturate the capacity of the sensor associated with that pixel and belonging to said detection device. If a higher number of photons is received, the attributed brightness value will remain equal to said maximum brightness value.

In colour detection, said maximum brightness value corresponds to the brightness value attributed to the sensor/s (e.g. a set of three sensors) associated with the same pixel, when said sensor or each one of said sensors is/are being struck by the maximum number of photons that it/they can receive. In case of multiple sensors associated with the same pixel, each one may be dedicated, for example, to detecting a respective fundamental chromatic component of the light striking that pixel.

The strip-like elements, suitably disposed adjacent to each other or partly mutually overlapped, contribute to forming the different components of a tyre, being laid on a forming drum preferably having a substantially toroidal or substantially cylindrical conformation.

In particular, the strip-like elements can be used for making one or more carcass plies of the carcass structure and/or one or more belt strips or layers of the tyre belt structure.

Document WO2012/085632, in the name of the same Applicant, describes a method and apparatus to control manufacturing and feeding of semifinished products in a tyre building process.

SUMMARY OF THE INVENTION

The Applicant has noticed that, as semifinished products are unwound from the reels whereon they have been wound together with the so-called service fabric (film of plastic material, preferably Polyester or Polyethylene), it may happen that some service fabric portions will remain associated with the semifinished product even after the semifinished product has been separated from the service fabric, mainly because of the adhesive properties of the compound that the semifinished product is made of.

The applicant has also verified that the original length of the service fabric is very often different from that of the semifinished product; for example, the service fabric may be available in rolls of about 700 m, while the length of the semifinished product may range between 2,000 m and 4,000 m, depending on the type of component to be manufactured. Different portions of service fabric must therefore be joined together to obtain suitable lengths for the semifinished product involved.

The Applicant has also verified that the service fabric, after having been separated from the semifinished product during the unwinding operation, is collected into auxiliary reels for further reuse. Said service fabric is used repeatedly even for semifinished products having different lengths; therefore, the length of the service fabric may have to be reduced, or it may have to be increased by joining it to an additional portion, e.g. by means of adhesive tape.

The Applicant has noticed that, following the separation between the service fabric (after repeated use) and the semifinished product, some portions of the service fabric or even of the adhesive tape used for joining may remain associated with the semifinished product.

The Applicant has also noticed that the presence of residues of service fabric and/or adhesive tape on the semifinished product may have extremely adverse consequences on the structure, performance and integrity of the tyre, since such residues may prevent proper adhesion between the strip-like elements of a component and/or between different components of the tyre.

The Applicant has also noticed that some types of tape used for joining the service fabric may be particularly difficult to detect, especially by an artificial vision/detection system, because they are partially transparent or small, and, when pressed against the semifinished product, will tend to appear substantially of the same colour as the semifinished product itself.

The Applicant has perceived that, by appropriately setting the operative parameters of an artificial vision/detection system, it will be possible to detect the presence of adhesive tape residues even in the most difficult cases, thus significantly reducing the number of components or tyres that will have to be discarded during and/or at the end of the process.

The Applicant has also perceived that, by setting a first threshold relating to brightness values detected in portions of images of the semifinished product under investigation, and a second threshold relating to the areas occupied by bright/dark zones detected in said image, it will be possible to discriminate, in the digital images detected, portions of semifinished product from residues of service fabric and adhesive tape or foreign bodies in general, thereby considerably improving the overall efficiency of the production process.

However, the Applicant has noticed that, in the artificial vision/detection instruments currently available, the precision (or resolution) with which the second threshold can be set suffers from some criticalities that are difficult to handle.

In fact, the Applicant has verified that the second threshold can only be determined with a resolution that is limited a priori; this may imply non-optimal system operation because, in some circumstances, the value attributed to the second threshold will actually turn out to be too low or too high.

In particular, assuming that the second threshold represents the maximum allowable value for the area of the semifinished product that is occupied by foreign bodies and/or defects that need to be detected (the exact theoretical value being 2.5% of the total area of the portion of semifinished product taken into account), the Applicant has verified the following two cases:
  the second threshold is set too high (e.g.: 3%): in this case, not all foreign bodies or defects that should trigger a notification might be correctly detected (particularly those having an area in the range of 2.5% to 3% of the total area);
  the second threshold is set too low (e.g.: 2%): in this case, a number of false notifications will be generated due to small foreign bodies that would not impair the quality of the product, while however exceeding the preset threshold (particularly those having an area in the range of 2% to 2.5%).

The Applicant has noticed that in the former case this inaccuracy may lead to criticalities especially for high-end tyres, which must ensure very high performance: any undetected foreign bodies or defects may, in fact, impair the structure and/or the operation of the finished product, thus unduly reducing the performance thereof. In the latter case, the control system in use would be unreliable because of the high rate of false notifications/alarms, which would require further verifications, whether automatically or manually, resulting in a less efficient and more costly production process.

Finally, the Applicant has discovered that, by dividing into multiple sub-parts the digital images detected for analyzing the semifinished product, the resolution with which the second threshold is defined can be increased, because the latter, while still being subject to the same numerical resolution constraints, will be applied to smaller image portions. This will improve the accuracy of the value attributed to the second threshold, overcoming the above-mentioned problems.

In accordance with a first aspect, the invention relates to a method to control manufacturing and feeding of semifinished products in a tyre building process.

Preferably, said method comprises detecting at least one first image representative of a semifinished product.

Preferably, said method comprises dividing said at least one first image into a plurality of first sub-parts, wherein each one of said first sub-parts is composed of a plurality of first portions, each one associated with a respective brightness value.

Preferably, said method comprises defining a first threshold for said brightness values.

Preferably, said method comprises making a first comparison between the brightness values of said first portions and said first threshold.

Preferably, said method comprises, as a function of said first comparison, determining for each one of said first sub-parts a first operative parameter representative of a total area occupied in each first sub-part by the first portions associated with a brightness value smaller or greater than said first threshold.

Preferably, said method comprises making a second comparison between each one of said first operative parameters and a second threshold.

Preferably, said method comprises causing the generation of a first notification signal as a function of said second comparison.

In accordance with a second aspect, the invention relates to an apparatus to control manufacturing and feeding of semifinished products in a tyre building process.

Preferably, said apparatus comprises at least one first detection device for detecting at least one first image representative of a semifinished product.

Preferably, said apparatus comprises at least one first memory.

Preferably, said apparatus comprises at least one first processing unit associated with said first detection device and with said first memory.

Preferably, said at least one first processing unit is configured for dividing said at least one first image into a plurality of first sub-parts, wherein each one of said sub-parts is formed by a plurality of first portions, each one associated with a respective brightness value.

Preferably, said at least one first processing unit is configured for making a first comparison between the brightness values of said first portions and a first threshold stored in said first memory and concerning said brightness values.

Preferably, said at least one first processing unit is configured for, as a function of said first comparison, determining for each one of said first sub-parts a first operative parameter representative of a total area occupied in each first sub-part by the first portions associated with a brightness value smaller or greater than said first threshold.

Preferably, said at least one first processing unit is configured for making a second comparison between each one of said first operative parameters and a second threshold.

Preferably, said at least one first processing unit is configured for causing the generation of a first notification signal as a function of said second comparison.

The Applicant believes that in this manner it is possible to accurately and reliably identify any generic foreign bodies, service fabric residues and adhesive tape residues, even when this material is substantially transparent and therefore difficult to discern from those portions of semifinished product which are not covered by such residues.

The Applicant also believes that the second threshold can thus be defined in a more precise and accurate manner, so that potentially harmful foreign bodies can be effectively discriminated from other elements having a negligible impact upon the structure and quality of the semifinished product.

In accordance with one or more of the above-mentioned aspects, the invention comprises one or more of the preferred features specified in the following.

Preferably, a first linear scale of brightness values being provided, which is defined between a first value corresponding to a null brightness value and a second value corresponding to a maximum brightness value, wherein the absolute value of the difference between said first value and said second value defines an amplitude of said first linear scale, said first threshold is defined in relation to said first linear scale.

Preferably, said first threshold is such that the absolute value of the difference between said first threshold and said first value is comprised between about 5% and about 20% of the amplitude of said first linear scale.

Preferably, each first operative parameter is representative of a total area occupied in the respective first sub-part by the first portions associated with a brightness value smaller than said first threshold.

Preferably, said first notification signal is generated if one or more of said first operative parameters are smaller than said second threshold.

Preferably, said first image is a monochromatic image.

Preferably, said at least one first image is detected as said semifinished product is unwound from a reel and moved towards a building station for building elementary semifinished products, made by starting from said semifinished product.

Preferably, it is envisaged to cause the generation of, if one or more of said first operative parameters are smaller than said second threshold, a first interruption signal for deactivating one or more actuators that promote the unwinding of said semifinished product from said reel and/or the movement thereof towards said building station.

Preferably, it is envisaged to provide a first reference image representative of at least one portion of semifinished product with substantially no residues or foreign bodies, said first reference image being composed of a plurality of first reference portions, each one associated with a respective brightness value.

Preferably, it is envisaged to compare the brightness values of said first reference portions with said first threshold.

Preferably, it is envisaged to determine a first reference parameter representative of a total area occupied in said first reference image by the first reference portions associated with a brightness value smaller than said first threshold.

Preferably, it is envisaged to determine said second threshold as a function of said first reference parameter.

Preferably, providing said first reference image comprises detecting an image of said semifinished product in a portion thereof with substantially no residues or foreign bodies.

In this manner, the first reference parameter will be obtained in the same environmental conditions (e.g. brightness) in which the semifinished product will have to be inspected, thus making the method of the invention even more accurate and reliable.

Preferably, said first image is detected by a first detection device facing towards said semifinished product.

Preferably, it is envisaged to send an electromagnetic radiation onto at least said semifinished product in order to allow or promote the detection by said first detection device.

This minimizes detection inaccuracy due to variability of the brightness conditions in which the first detection device has to operate.

Preferably, it is envisaged to provide a first background wall on the opposite side of said semifinished product with respect to said first detection device.

Preferably, said first background wall is such that the portion/s of said first image reproducing said first background wall is/are associated with brightness values that are smaller than said first threshold.

It will thus be possible to properly detect even any fabric residues having only a small part in contact with the semifinished product and protruding laterally therefrom. Thanks to the contrast provided by the dark colour of the first background wall, such residues can be appropriately identified.

Furthermore, the fact that the first background wall is of a dark colour will prevent small variations in the width of the semifinished product from interfering with the correct computation of the amplitude of the "bright" portions in the detected image. The Applicant has noticed, in fact, that the width (i.e. the dimension orthogonal to the prevalent or axial direction of development of the semifinished product) is not always identical throughout the extension of the semifinished product; for example, some sections may be slightly narrower and/or wider. The Applicant has verified that a clear background wall will lead to corresponding increases/reductions in the overall extension of the bright area in the detected image, which may undesirably affect the resulting decision about the presence or absence of defects or foreign bodies. The Applicant has also verified that, with a clear background wall, the narrower/wider sections of the semifinished product may impair the accuracy and reliability of the comparison with the first reference image. The Applicant believes that, when using a background wall of a dark colour, the computation of the total area occupied by bright portions will be substantially independent of said variations in the width of the semifinished product, thus being more reliable.

Preferably, providing said first reference image comprises detecting at least one portion of said first background wall.

Preferably, said first image is representative of a portion of a first surface of said semifinished product.

Preferably, it is envisaged to detect a second image representative of a portion of a second surface of said semifinished product, opposite to said first surface.

Preferably, it is envisaged to divide said second image into a plurality of second sub-parts, each one of said second sub-parts being formed by a plurality of second portions, each one associated with a respective brightness value.

Preferably, it is envisaged to define a third threshold for said brightness values.

Preferably, it is envisaged to make a third comparison between the brightness values of said second portions and said third threshold.

Preferably, said third threshold is substantially equal to said first threshold.

Preferably, it is envisaged to determine, as a function of said third comparison, for each one of said second sub-parts, a second operative parameter representative of a total area occupied in each second sub-part by the second portions associated with a brightness value smaller or greater than said third threshold.

Preferably, it is envisaged to make a fourth comparison between each one of said second operative parameters and a fourth threshold.

Preferably, said fourth threshold is substantially equal to said second threshold.

Preferably, it is envisaged to cause the generation of a second notification signal as a function of said fourth comparison.

In this manner, a verification can be conducted on both surfaces of the semifinished product, thus further decreasing the probability that a semifinished product with associated residues of service fabric and/or adhesive tape might be supplied to the next building station.

Preferably, a second linear scale of brightness values being provided, which is defined between a third value corresponding to a null brightness value and a fourth value corresponding to a maximum brightness value, wherein the absolute value of the difference between said third value and said fourth value defines an amplitude of said second linear scale, said third threshold is defined in relation to said second linear scale.

Preferably, said third threshold is such that the absolute value of the difference between said third threshold and said third value is comprised between about 5% and about 20% of the amplitude of said second linear scale.

Preferably, each second operative parameter is representative of a total area occupied in the respective second sub-part by the second portions associated with a brightness value smaller than said third threshold.

Preferably, said second notification signal is generated if one or more of said second operative parameters are smaller than said fourth threshold.

Preferably, said second image is a monochromatic image.

Preferably, it is envisaged to cause the generation of, if one or more of said second operative parameters are smaller than said fourth threshold, a second interruption signal for deactivating one or more actuators that promote the unwinding of said semifinished product from said reel and/or the movement thereof towards said building station.

Preferably, said first detection device faces towards the first surface of said semifinished product.

Preferably, said semifinished product, as it is unwound from said reel and moved towards said building station, follows a predetermined path.

Preferably, said first image and said second image are detected in different positions along said path.

This will prevent the two detection operations from interfering with each other.

Preferably, said second image is detected by a second detection device facing towards the second surface of said semifinished product.

Preferably, it is envisaged to send an electromagnetic radiation onto at least said semifinished product in order to allow or promote the detection by said second detection device.

This minimizes detection inaccuracy due to variability of the brightness conditions in which the second detection device has to operate.

Preferably, it is envisaged to provide a second background wall on the opposite side of said semifinished product with respect to said second detection device.

Preferably, said second background wall is such that the portion/s of said second image reproducing said second background wall is/are associated with brightness values that are smaller than said third threshold.

It will thus be possible to properly detect even any fabric residues having only a small part in contact with the semifinished product and protruding laterally therefrom. Thanks to the contrast provided by the dark colour of the second background wall, such residues can be appropriately identified.

Furthermore, as described in detail with reference to the first background wall, the fact that the second background wall is of a dark colour will prevent small variations in the width of the semifinished product from interfering with the correct computation of the amplitude of the "bright" portions in the detected image.

Preferably, each one of said first sub-parts is partially superimposed, in one or more respective superimposition areas, on one or more of the first sub-parts adjacent thereto.

Preferably, a dimension of said superimposition areas is substantially greater than or equal to about half a dimension of a minimum area element to be detected.

In this manner, it will also be possible to correctly detect fabric residues or, more in general, foreign bodies and/or defects located across adjacent parts. Otherwise, if adjacent parts were not made to overlap, residues/foreign bodies/defects of this kind would be hardly detected because they would occupy areas that are too small, i.e. smaller than the second threshold, in each sub-part.

Preferably, said first processing unit is configured for causing the generation of, if one or more of said first operative parameters are smaller than said second threshold, a first interruption signal for deactivating one or more actuators that promote the unwinding of said semifinished product from said reel and/or the movement thereof towards said building station.

Preferably, a first emitter device is included, which is positioned on the same side of said semifinished product as said first detection device, and which is configured for sending an electromagnetic radiation onto at least said semifinished product in order to allow or promote the detection by said first detection device.

Preferably, a first background wall is provided on the opposite side of said semifinished product with respect to said first detection device.

Preferably, said first background wall is such that the portion/s of said first image reproducing said first background wall is/are associated with brightness values that are smaller than said first threshold.

Preferably, said first detection device faces towards a first surface of said semifinished product.

Preferably, a second detection device is provided, which faces towards a second surface of said semifinished product which is opposite to said first surface, said second detection device being adapted to detect a second image representative of a portion of the second surface of said semifinished product.

Preferably, a second memory is included.

Preferably, a second processing unit is provided, which is associated with said second detection device.

Preferably, said second processing unit is configured for dividing said second image into a plurality of second sub-parts, each one of said second sub-parts being formed by a plurality of second portions, each one associated with a respective brightness value.

Preferably, said second processing unit is configured for making a third comparison between the brightness values of said second portions and a third threshold stored in said second memory and concerning said brightness values.

Preferably, said second processing unit is configured for determining, as a function of said third comparison, for each one of said second sub-parts, a second operative parameter representative of a total area occupied in each second sub-part by the second portions associated with a brightness value smaller or greater than said third threshold.

Preferably, said second processing unit is configured for making a fourth comparison between each one of said second operative parameters and a fourth threshold.

Preferably, said second processing unit is configured for causing the generation of a second notification signal as a function of said fourth comparison.

Preferably, said second processing unit is configured for causing the generation of, if one or more of said second operative parameters are smaller than said fourth threshold, a second interruption signal for deactivating one or more actuators that promote the unwinding of said semifinished product from said reel and/or the movement thereof towards said building station.

Preferably, said first and second detection devices are located in different positions along the path followed by said semifinished product as it is unwound from said reel and moved towards said building station.

Preferably, a second background wall is provided on the opposite side of said semifinished product with respect to said second detection device.

Preferably, said second background wall is such that the portion/s of said second image reproducing said second background wall is/are associated with brightness values that are smaller than said third threshold.

Preferably, a second emitter device is included, which is positioned on the same side of said semifinished product as said second detection device, and which is configured for sending an electromagnetic radiation onto at least said semifinished product in order to allow or promote the detection by said second detection device.

BRIEF DESCRIPTION OF THE DRAWINGS

Further features and advantages will become more apparent from the following detailed description of one preferred and non-limiting embodiment of the invention. This description will refer to the annexed drawings, which are also provided merely as explanatory and non-limiting examples, wherein:

FIGS. 3a-3b respectively show, in a schematical manner, some enlarged details of FIGS. 2a-2b;

DETAILED DESCRIPTION OF THE INVENTION

With reference to the annexed drawings, 1 designates as a whole an apparatus for controlling production and feeding of semifinished products in a tyre building process.

Figure 1:
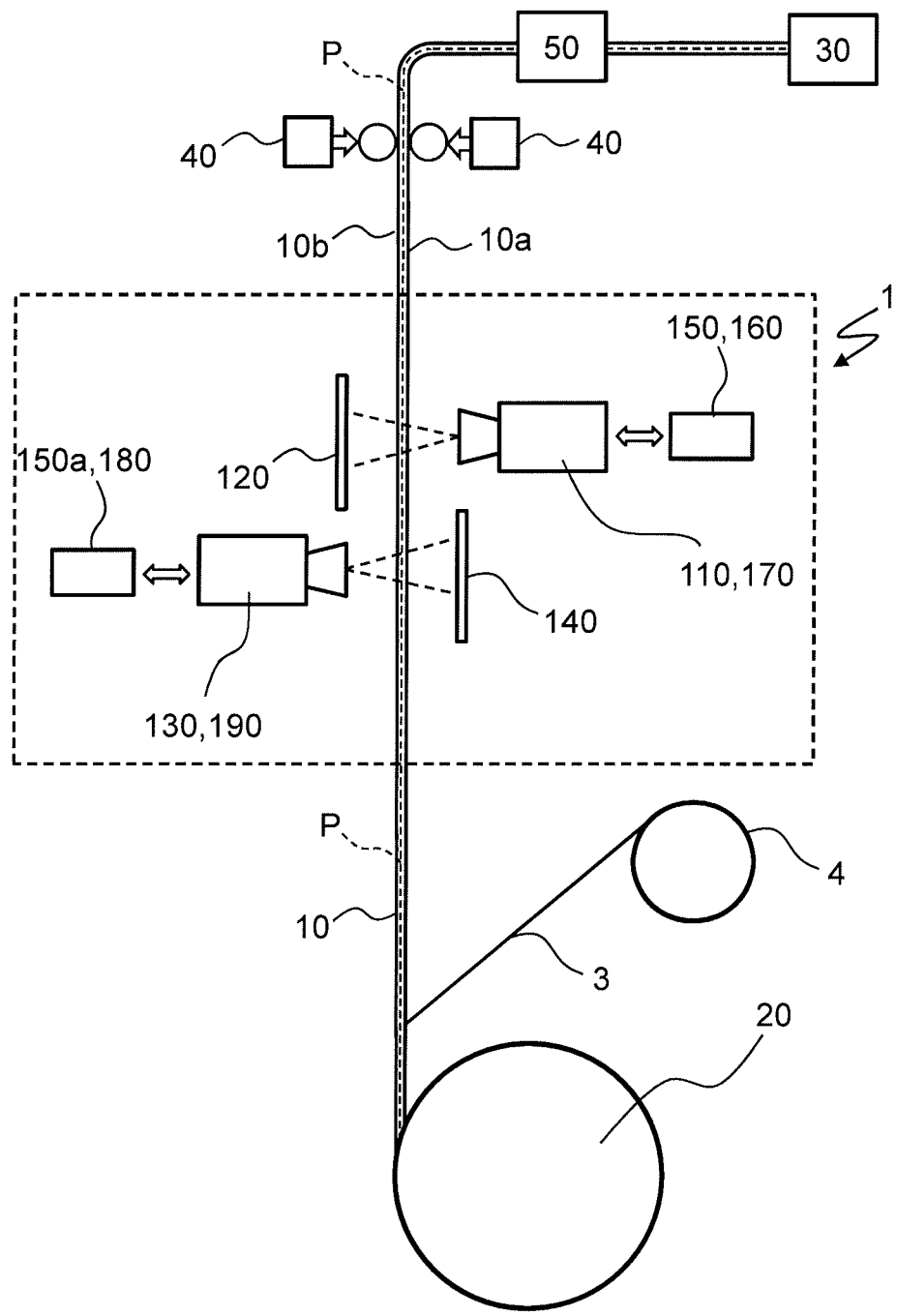
FIG. 1 schematically shows a part of a tyre building plant comprising an apparatus according to the present invention.

As schematically shown in FIG. 1, the apparatus 1 is used for controlling a semifinished product 10, which is unwound from a reel 20.

On the reel 20, the semifinished product is initially wound together with a service fabric 3; as it is unwound from the reel 20, the semifinished product 10 and the service fabric 3 are separated in a per se known manner.

The service fabric 3 is preferably wound on an auxiliary reel 4.

The semifinished product 10, instead, is appropriately moved towards a subsequent building station 30, wherein elementary semifinished products (not shown) are prepared, and then used, by starting from said semifinished product 10.

In one embodiment, prior to being fed to the building station 30, the semifinished product 10 is accumulated at a suitable accumulation station 50, which is advantageously used for controlling the plant's working times and synchronizing the various stations.

The unwinding of the semifinished product 10 from the reel 20 and the movement thereof towards the building station 30 occur by means of one or more suitable actuators 40, preferably of the electromechanical type, associated with, for example, one or more rollers contributing to defining the trajectory followed by the semifinished product 10.

As schematically shown in FIG. 1, the semifinished product 10 follows a path P from the reel 20 to the building station 30.

The apparatus 1 comprises, first of all, at least one first detection device 110 for detecting at least one first image A representative of the semifinished product 10.

Preferably, said first image A is a monochromatic image.

The first detection device 110 may comprise a photosensitive sensor or element capable of converting the received luminous radiation into an electric signal, and the circuitry necessary for making said electric signal usable by other devices/apparatuses, which will be described in detail below.

By way of example, the sensor may be of the CMOS type.

Other types of sensors may however be used, provided that they have suitable functional features.

In one embodiment, the first detection device 110 may comprise or be associated with a polarizer filter.

Figure 6:
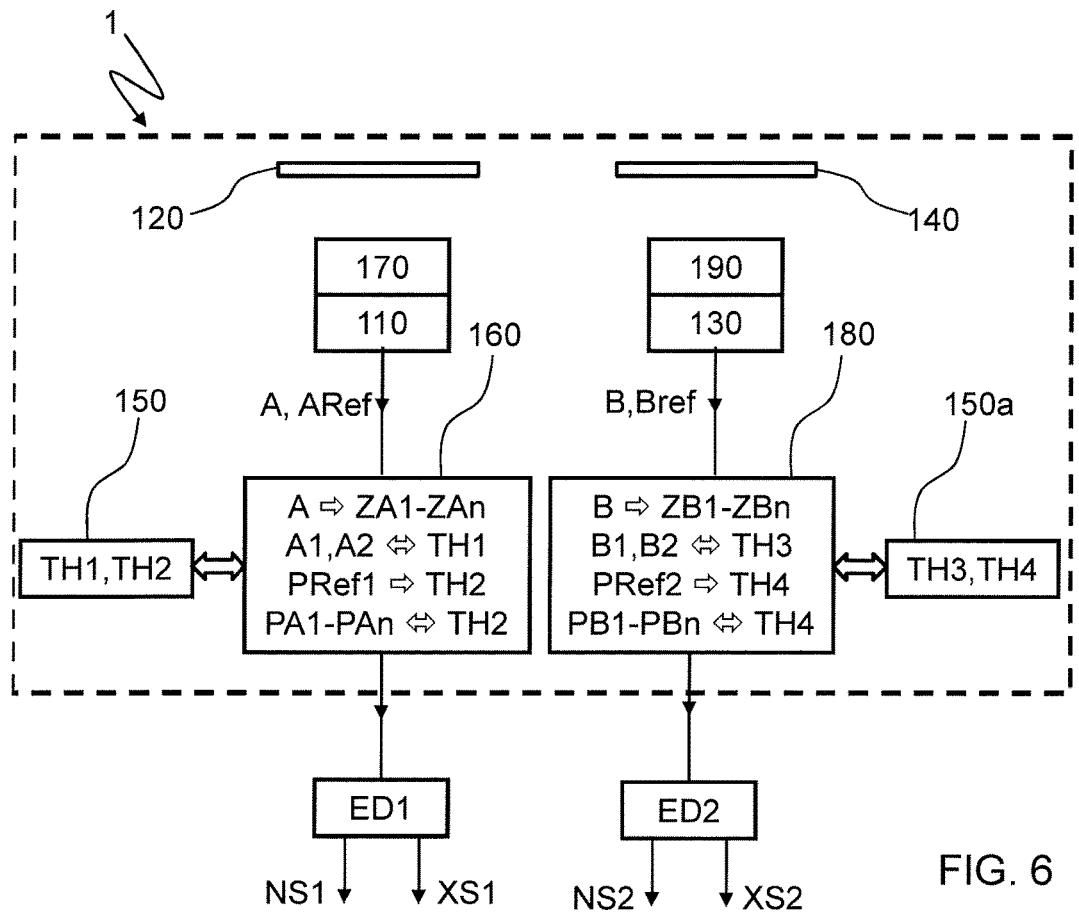
FIG. 6 shows a block diagram of the apparatus of FIG. 1.

The apparatus 1 comprises a first processing unit 160, associated with at least the first detection device 110 and a first memory 150 (FIGS. 1, 6).

The first processing unit 160 is configured for dividing the first image A into a plurality of first sub-parts ZA1-ZAn.

Preferably, all the first sub-parts ZA1-ZAn have the same area.

By way of example, the first image A may have a substantially rectangular perimeter; the first sub-parts ZA1-ZAn may be, for example, rectangular or square.

Figure 2A:
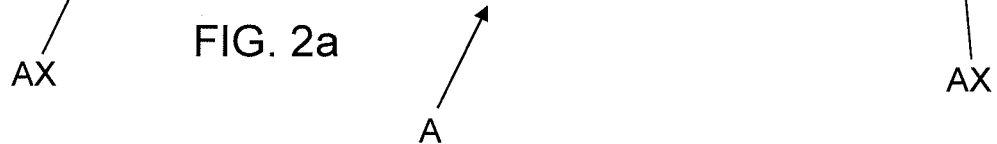
FIGS. 2a-2b, 4a-4b schematically show some exemplary images as used in the apparatus and method according to the invention.
Figure 2B:
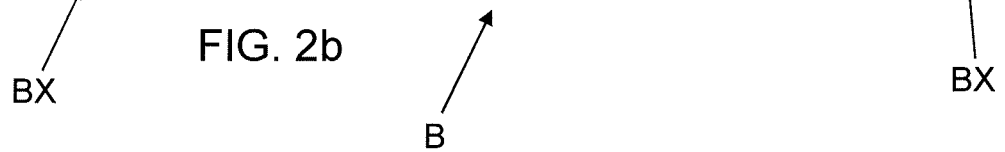

By way of example, the first image A may be divided into nine or sixteen sub-parts. FIG. 2a shows an embodiment in which the first image A is divided into sixteen first sub-parts ZA1-ZAn.

Each first sub-part ZA1-ZAn is composed of a plurality of first portions A1, A2, each one associated with a respective brightness value (FIG. 3a).

The first portions A1, A2 may consist of single pixels or groups of pixels.

If each first portion A1, A2 consists of a respective single pixel, then the brightness value attributed to such portion will be the brightness value of the respective pixel.

If each portion A1, A2 includes two or more pixels, then the brightness value associated with the portion A1, A2 will be determined as a function of the brightness values of the various pixels making up the portion.

The Applicant notes that the brightness value of a pixel of an image is determined on the basis of the number of photons striking the corresponding pixel of the sensor included in the first detection device 110.

In particular, the higher the number of photons striking a pixel of the sensor, the higher the brightness value attributed to the corresponding pixel in the image.

It must be pointed out that each pixel of the sensor can receive a limited number of photons; this limit is imposed by the so-called capacity of the sensor.

If said pixel receives a number of photons equal to or greater than said limited number, then the brightness value associated with that pixel will be a maximum value, without growing any further even should the number of incident photons increase.

In FIG. 3a, references A1, A2 identify pixels having different brightness values.

Of course, FIG. 3a represents any one first sub-part ZA1-ZAn in a wholly exemplificative and schematic manner: each one of the first sub-parts ZA1-ZAn may have portions/pixels having different brightness from the other first sub-parts.

The apparatus 1 further comprises a first memory 150 storing a first threshold TH1 for said brightness values.

Figure 7A:
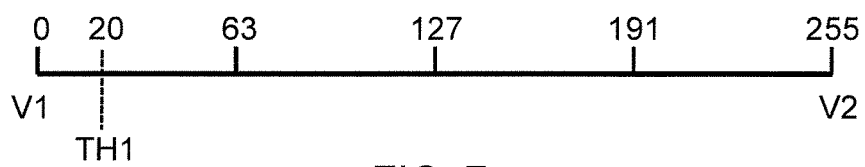
FIGS. 7a, 7b show some parameters used in the apparatus and method according to the invention.

The first threshold TH1 is defined within a first linear scale of brightness values (FIG. 7a). The first scale ranges from a first value V1 to a second value V2.

The first value V1 corresponds to a null brightness value; preferably, the first value V1 coincides with said null brightness value.

The second value V2 corresponds to a maximum brightness value; preferably, the second value V2 coincides with said maximum brightness value.

The absolute value of the difference between the first value V1 and the second value V2 defines the amplitude of the first scale.

The absolute value of the difference between the first threshold TH1 and the first value V1 is comprised between about 5% and about 20% of the amplitude of the first scale.

FIG. 7a schematically shows a first scale of brightness values, wherein the first value V1 is zero, the second value V2 is 255, and the first threshold TH1 is set by way of example to 20. In FIG. 3a, reference A1 identifies those pixels having brightness values smaller than the first threshold TH1, whereas reference A2 identifies those pixels having brightness values greater than the first threshold TH1.

Note that in FIG. 3a reference A1 has only been associated with some pixels for the sake of simplicity; reference A1 is meant to identify all those pixels or groups of pixels that are associated with brightness values smaller than the first threshold TH1.

The first processing unit 160 is configured for making a first comparison between the brightness values associated with the portions A1, A2 of each one of the first sub-parts ZA1-ZAn and the first threshold TH1.

As a function of said first comparison, for each first sub-part ZA1-ZAn the first processing unit 160 is configured for determining a first operative parameter PA1-PAn representative of a total area occupied in each first sub-part ZA1-ZAn by the first portions A1 associated with a brightness value smaller or greater than the first threshold TH1, preferably smaller than said first threshold TH1.

In practical terms, the first operative parameters PA1-PAn express the extent to which dark areas are present in the respective first sub-parts ZA1-ZAn.

In other words, the first processing unit 160 is configured for examining each first sub-part ZA1-ZAn and computing, for each one of them, a first operative parameter PA1-PAn representative of the extension of the total dark area in the respective first sub-part ZA1-ZAn. The first processing unit 160 is configured for comparing each first operative parameter PA1-PAn with a second threshold TH2.

Preferably, the second threshold TH2 is representative of the minimum allowable total area occupied in a first sub-part by the portions having a brightness value smaller than the first threshold TH1.

By way of example, the second threshold TH2 can be defined in terms of percent ratio between the area occupied by sufficiently dark pixels (i.e. pixels having a brightness value smaller than the first threshold TH1) and the total area of the first sub-part ZA1-ZAn under consideration.

The second threshold TH2 is suitably set as a function of the dimensions of the first image A, the dimensions of the first sub-parts ZA1-ZAn, and the dimensions of that part of the first image A which is occupied by the representation of the semifinished product 10.

If the first detection device 110 is positioned at a distance between about 100 mm and about 300 mm from the semifinished product 10, it can be hypothesized to set the desired total "dark" area for the first image A to a value ranging from about 90% to about 98%.

By way of example, let us consider a limit set to about 95%.

This means that the "bright" area in the first image A should not exceed 5% of the total area of the first image A.

Let us now assume that the first image A is divided into sixteen first sub-parts ZA1-ZAn. Considering now only a single sub-part ZA1-ZAn, the minimum bright "spot" that must be detected will have to be 80% of the total area of the single sub-part, the area of the single sub-part being sixteen times smaller than the area of the entire first image A.

The second threshold TH2 for each first sub-part ZA1-ZAn could thus be set to 20%. Conveniently, said second threshold may be suitably refined based on more detailed analyses of the exact extent of the residues and/or defects that need to be detected.

The value of 20% hypothesized above could be modified by a few percentage points, e.g. to 18% or 22%, should it turn out to be advisable to do so.

The Applicant notes that a variation by one percentage point of the second threshold TH2 defined for the single sub-parts ZA1-ZAn will correspond to a variation of 1/N % of the corresponding threshold defined for the entire first image A, where N represents the number of sub-parts into which the first image A has been divided (e.g. sixteen).

Therefore, by adjusting the second threshold TH2 for the single first sub-parts ZA1-ZAn, one can virtually increase the resolution with which the actual limit will be imposed, thereby improving the accuracy with which any residues, foreign bodies and defects appearing as bright spots will be discriminated.

In one embodiment, the second threshold TH2 can be determined in an at least partially automated manner.

Figure 4A:
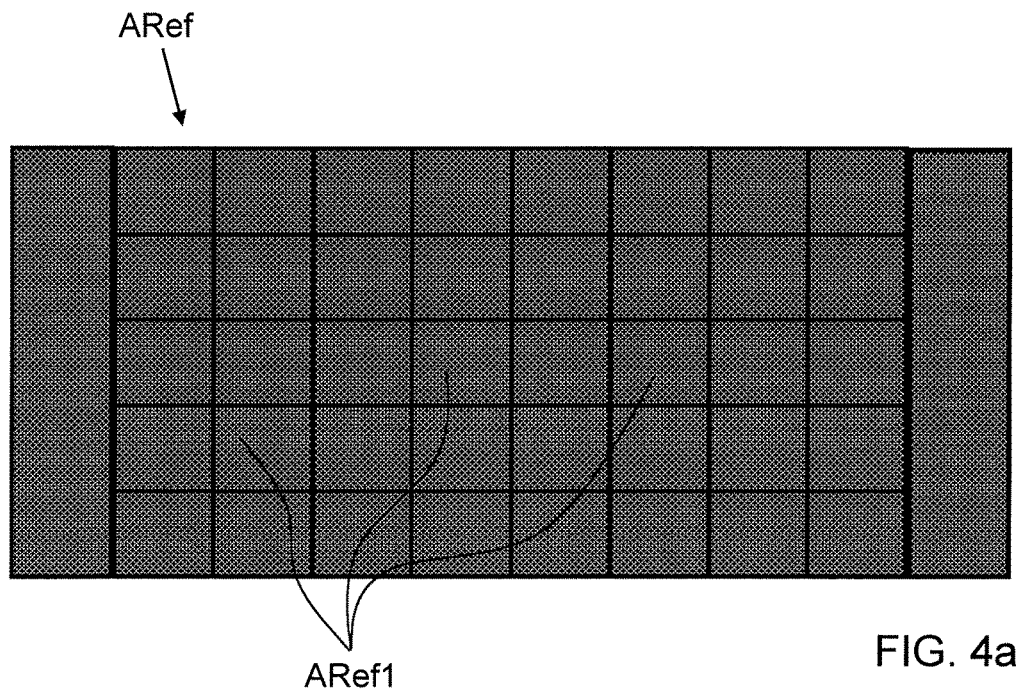

In particular, a first reference image ARef (FIG. 4a) may be provided, which is representative of at least a portion of semifinished product 10 that is substantially free from residues or foreign bodies.

The first reference image ARef may be created artificially, e.g. by means of graphic processing software programs, or may be detected through the first detection device 110. In this second case, a portion of semifinished product will be accurately selected which is totally free from residues or foreign bodies.

The first reference image ARef comprises a plurality of first reference portions ARef1. Preferably, each first reference portion ARef1 has the same area.

Each first reference portion ARef1 is associated with a respective brightness value. Advantageously, the brightness value of each one of the first reference portions ARef1 is compared with the first threshold TH1.

By means of this comparison, a first reference parameter PRef1 is determined, which is representative of the total area occupied in the first reference image ARef by the first reference portions ARef1 associated with a brightness value smaller than the first threshold TH1.

Based on the first reference parameter PRef1, the second threshold TH2 can then be determined.

In practical terms, the first reference parameter PRef1 represents the extension that the area occupied by dark pixels should have in an ideal or anyway optimal portion of semifinished product.

By computing the ratio between that area and the total area of the first reference image ARef, it is thus possible to determine the optimal percentage of dark pixels in the first image A. As a function of such percentage, the second threshold TH2 can finally be determined, taking into account the minimum dimensions of the foreign bodies or defects that need to be detected.

By way of example, the second threshold TH2 may to some extent be lower than the optimal percentage identified on the basis of the first reference parameter PRef1, for the purpose of avoiding that any non-ideal conditions and imperfections of the system or simply any small areas which are brighter than average, which however will not affect the quality of the semifinished product, might alter the results of the analyses executed by the apparatus 1.

Note that the first reference image ARef and the first image A preferably have the same dimensions, and the semifinished product 10 is represented in both images with the same proportions, e.g. according to the same reduction or enlargement scale.

By way of example, if the first reference image ARef is detected through the first detection device 110, the latter must be positioned at a distance from the semifinished product which equals the distance it is at when the same first detection device 110 is detecting the first image A. The optics of the first detection device 110 are preferably configured in the same way in both cases to avoid introducing any dishomogeneousness in terms of enlargement/reduction of the represented semifinished product.

As aforesaid, the first processing unit 160 is configured for comparing each first operative parameter PA1-PAn with the second threshold TH2.

As a function of said comparison, the first processing unit 160 will cause the generation of a first notification signal NS1.

Preferably, the first processing unit 160 will cause the generation of a first notification signal NS1 if one or more of the first operative parameters PA1-PAn are smaller than the second threshold TH2.

In practice, the fact that at least one of the first sub-parts ZA1-ZAn does not have, as a whole, a sufficiently large dark area is attributed to the presence of undesired elements, such as, for example, portions of adhesive tape and/or residues of service fabric, resulting in the generation of the first notification signal NS1.

The purpose of the first notification signal NS1 is to inform the system operator about the critical situation. The system operator will then be able to take appropriate steps, e.g. by removing the portions of adhesive tape and/or the residues of service fabric from the semifinished product 10.

In one embodiment, the first processing unit 160 generates the first notification signal NS1 directly, in order to warn the operator through an audible and/or visual signal.

In a different embodiment, the first processing unit 160 cooperates with at least one first external device ED1, separate from it, such as a PLC, the task of which is to control the apparatus 1 and any other apparatuses and/or stations included in the plant. In this case, the first processing unit 160 will output a piece of information representative of the fact that at least one of the first operative parameters PA1-PAn is smaller than the second threshold TH2. Upon receiving such information, the first external device ED1 will then generate the first notification signal NS1.

Preferably, the at least one first image A is detected as the semifinished product 10 is unwound from the above-mentioned reel 20.

Preferably, if one or more of the first operative parameters PA1-PAn turn out to be smaller than the second threshold TH2, then the first processing unit 160 will cause the generation of a first interruption signal XS1 for deactivating one or more actuators 40.

This will stop the feeding of the semifinished product 10 to facilitate the operator's intervention, should it be necessary.

Also the first interruption signal XS1 may be directly generated by the first processing unit 160, or it may be generated by the first external device ED1 with which the first processing unit 160 cooperates. In particular, said first external device ED1, upon receiving the information about the fact that at least one of the first operative parameters PA1-PAn is smaller than the second threshold TH2, may take care of generating both the first notification signal NS1 and the first interruption signal XS1.

Preferably, in the first image A each one of the first sub-parts ZA1-ZAn is partially superimposed, in one or more respective superimposition areas, on one or more of the first sub-parts adjacent thereto, respectively in the superimposition areas SA1, SA2, SA3, SA4. Preferably, each first sub-part ZA1-ZAn is partially superimposed on all the first sub-parts adjacent thereto.

Figure 5A:
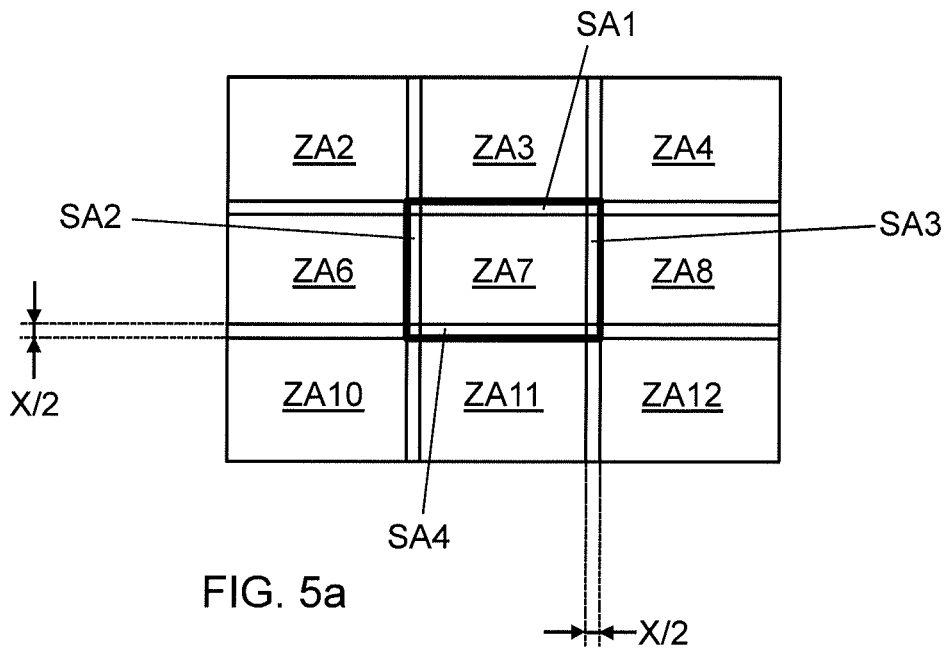
FIGS. 5a-5b respectively show, in a schematical manner, some details of FIGS. 2a-2b, wherein some parts have been removed in order to highlight other parts.

Let us consider, by way of example, the first sub-part ZA7 in FIG. 5a: it is superimposed, to a certain extent, on the adjacent first sub-parts ZA3, ZA6, ZA8, ZA11.

Preferably, the superimposition extent is determined in such a way that a dimension of said superimposition areas is substantially greater than or equal to about half a dimension of a minimum area element to be detected.

As aforesaid, the first sub-parts ZA1-ZAn are preferably substantially square or rectangular. The superimposition areas will therefore be, for example, substantially rectangular.

If we imagine to approximate the minimum area element that must be detected (i.e. service fabric residue, foreign body, defect, etc.) as a square having a diagonal X or a circle having a diameter X, the superimposition area between two first sub-parts may be a rectangle, the dimensions of which will be the length of the side of one sub-part comprised within the area of the adjacent sub-part, and X/2.

In this manner it will be possible to correctly detect any undesired elements across adjacent sub-parts, which might otherwise not be detected.

Preferably, the apparatus 1 further comprises at least one first emitter device 170 positioned on the same side of the semifinished product 10 as the first detection device 110.

As schematically shown in FIG. 1, the first detection device 110 and the first emitter device 170 face towards a first surface 10a of the semifinished product 10.

The first emitter device 170 is configured for sending an electromagnetic radiation onto at least the semifinished product 10 in order to allow or promote the detection by said first detection device 110.

Preferably, the radiation emitted by the first emitter device 170 is a luminous radiation in the visible range, e.g. obtained through one or more appropriately configured and powered LED emitters E1-E8.

Figure 8:
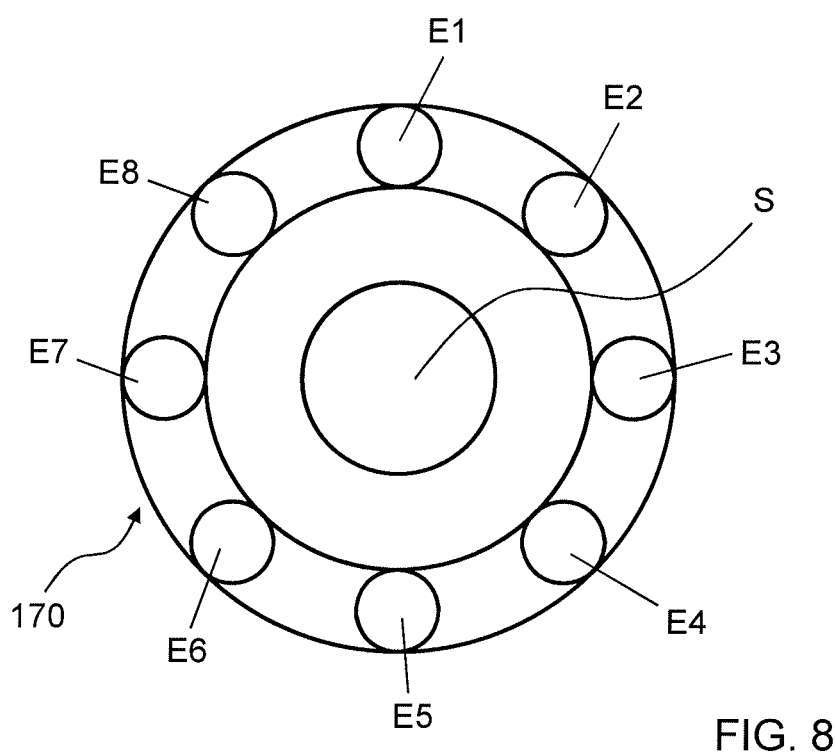
FIG. 8 schematically shows a detail of a device included in the apparatus of FIG. 1 and FIG. 6.

By way of example, the first emitter device 170 may be of the crown type (FIG. 8); the sensor S of the first detection device 110 may advantageously be positioned in a central area, around which the emitters E1-E8 are circumferentially arranged.

Preferably, in order to maximize the quality of the detection carried out by the first detection device 110, the apparatus 1 comprises at least one first background wall 120 positioned on the opposite side of the semifinished product 10 with respect to the first detection device 110. In other words, the semifinished product 10 is interposed between the first detection device 110 and the first background wall 120.

The task of the first background wall 120 is to improve the reliability of the detection of the first image A and the next processing aimed at identifying any defects and/or service fabric residues and/or foreign bodies; in particular, the first background wall 120 is such that the portions AX of the first image A that reproduce the first background wall 120 will be associated with brightness values smaller than the first threshold TH1.

It will thus be possible to properly detect even any fabric residues having only a small part in contact with the semifinished product and protruding laterally therefrom. Thanks to the contrast provided by the dark colour of the first background wall 120, such residues can be appropriately identified.

Furthermore, the fact that the first background wall 120 is of a dark colour prevents small variations in the width of the semifinished product 10 from interfering with the correct computation of the amplitude of the "bright" portions in the detected images.

In practical terms, the first emitter device 170 illuminates the portion of semifinished product 10 that must be detected by the first detection device 110, and possibly the first background wall 120 as well (if present). The first detection device 110 will thus detect the corresponding reflected radiation, so as to define the first image A.

Preferably, the first background wall 120 is used for defining the above-mentioned first reference image ARef; the latter may in fact also comprise part of the first background wall 120.

In a preferred embodiment, the apparatus 1 further comprises a second detection device 130 facing towards a second surface 10b, opposite to the above-mentioned first surface 10a, of the semifinished product 10.

Preferably, the second detection device 130 is positioned, along the path P followed by the semifinished product 10, in a different position from the first detection device 110.

The second detection device 130 may comprise a photosensitive sensor or element capable of converting the received luminous radiation into an electric signal, and the circuitry necessary for making said electric signal usable by other devices/apparatuses, which will be described in detail below.

By way of example, the sensor may be of the CMOS type.

Other types of sensors may however be used, provided that they have suitable functional features.

In one embodiment, the second detection device 130 may comprise or be associated with a polarizer filter.

Preferably, the second detection device 130 has structural and functional characteristics similar to those of the first detection device 110.

The second detection device 130 is adapted to detect a second image B of the semifinished product 10.

Preferably, the second image B is a monochromatic image.

The second detection device 130 is associated with a second processing unit 180 (FIGS. 1, 6).

The second processing unit 180 is configured for dividing the second image B into a plurality of second sub-parts ZB1-ZBn; each one of said second sub-parts ZB1-ZBn is formed by a plurality of second portions B1, B2, each one associated with a respective brightness value. Preferably, all the second sub-parts ZB1-ZBn have the same area.

By way of example, the second image B may be divided into nine or sixteen second sub-parts ZB1-ZBn.

Preferably, the first image A and the second image B are divided into the same number of sub-parts.

The second processing unit 180 is configured for comparing the brightness values of the second portions B1, B2 with a third threshold TH3.

Figure 7B:
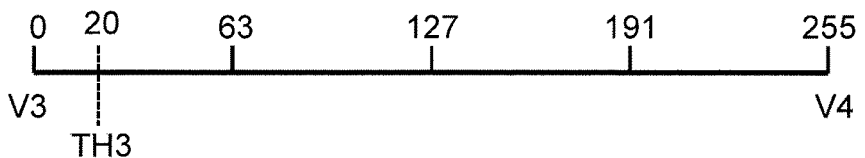

The third threshold TH3 is defined within a second linear scale of brightness values (FIG. 7b).

The second linear scale of brightness values is comprised between a third value V3 and a fourth value V4.

The third value V3 substantially corresponds to a null brightness value; preferably, the third value V3 coincides with said null brightness value.

The fourth value V4 substantially corresponds to a maximum brightness value; preferably, the fourth value V4 coincides with said maximum brightness value.

The absolute value of the difference between the third value V3 and the fourth value V4 defines the amplitude of the second scale.

The absolute value of the difference between the third threshold TH3 and the third value V3 is comprised between about 5% and about 20% of the amplitude of the second scale.

Preferably, the third threshold TH3 coincides with the first threshold TH1.

Preferably, the third value V3 coincides with the first value V1, and the fourth value V4 coincides with the second value V2; in particular, the second scale may coincide with the first scale.

In a different embodiment, the third threshold TH3 does not coincide with the first threshold TH1. The first and second scales, together with the respective first, second, third and fourth values V1-V4, may differ from each other.

When the first and third thresholds TH1, TH3 do not coincide, the third threshold TH3 may be stored in a second memory 150a.

The second processing unit 180 determines, as a function of the comparison between the brightness values of the second portions B1, B2 and the third threshold TH3, for each second sub-part ZB1-ZBn, a second operative parameter PB1-PBn.

Each second operative parameter PB1-PBn is representative of a total area occupied in the respective second sub-part ZB1-ZBn by the second portions B1 associated with a brightness value smaller or greater than the third threshold TH3, preferably smaller than said third threshold TH3.

The second processing unit 180 is configured for comparing each second operative parameter PB1-PBn with a fourth threshold TH4.

Preferably, the fourth threshold TH4 is representative of the minimum allowable total area occupied by those portions of a single second sub-part ZB1-ZBn that have a brightness value smaller than the third threshold TH3.

By way of example, the fourth threshold TH4 can be defined in terms of percent ratio between the area occupied by sufficiently dark pixels (i.e. pixels having a brightness value smaller than the third threshold TH3) and the total area of the single sub-part ZB1-ZBn.

Preferably, the fourth threshold TH4 coincides with the second threshold TH2.

In a different embodiment, the fourth threshold TH4 is computed independently of the second threshold TH2.

The Applicant notes that the division of the first image A and second image B into a plurality of respective sub-parts ZA1-ZAn, ZB1-ZBn is used in order to improve the resolution with which the second and/or fourth thresholds TH2, TH4 are defined. The Applicant also notes that the division into sub-parts allows searching for smaller foreign bodies, the value of the second threshold TH2 and fourth threshold TH4 being equal.

For example, it will be checked that, for each image A or B, each one divided into the sub-parts ZA1-ZAn and ZB1-ZBn, the "bright" area does not exceed 5% of the total area of the image A or of the image B, respectively.

For this reason it is preferable, as described above, that the sub-parts ZA1-ZAn, ZB1-ZBn have all the same area. Their pixel dimension depends on the size of the framed area, while the second threshold TH2 and fourth threshold TH4 depend on the minimum dimensions of the foreign body to be detected. In this manner, the thresholds TH2 and TH4 can be set to the same value for all sub-parts ZA1-ZAn and ZB1-ZBn, respectively.

If this were not the case, i.e. if the sub-parts ZA1-Zan and/or ZB1-ZBn were different from one another, a foreign body having limit dimensions (close to TH2 and/or TH4) in a "smaller" sub-part will be detected, but it might not be detected if it were in a "bigger" sub-part.

The operations carried out for computing the fourth threshold TH4 may be substantially identical to those required for computing the second threshold TH2. Differences may reside, for example, in the use of a different device (the second detection device 130 instead of the first detection device 110), in a different surface of the semifinished product taken as a reference (the second surface 10b instead of the first surface 10a), in different lighting conditions in which the reference images are detected, etc.

Figure 4B:
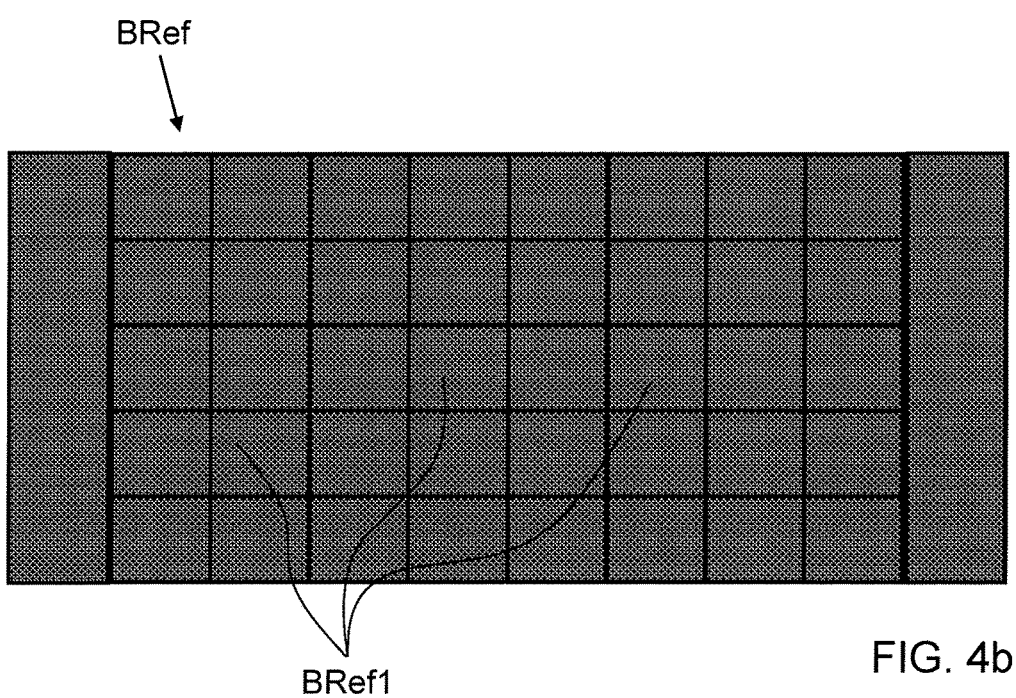

In brief, a second reference image BRef is detected (through the second detection device 130) or otherwise generated, which comprises second reference portions BRef1 (FIG. 4b) preferably having all the same area; by comparing the brightness of the second reference portions BRef1 with the third threshold TH3, a second reference parameter PRef2 is determined, which is representative of the extension of the area occupied by dark pixels for an ideal or anyway optimal portion of semifinished product; the fourth threshold TH4 can then be computed as a function of said second reference parameter PRef2.

As a function of a comparison between said second operative parameter P2 and said fourth threshold TH4, the second processing unit 180 will cause the generation of a second notification signal NS2.

Preferably, the second processing unit 180 will cause the generation of said second notification signal NS2 if one or more of the second operative parameters PB1-PBn turn out to be smaller than the fourth threshold TH4.

The second notification signal NS2 preferably has the same characteristics as the first notification signal NS1.

The purpose of the second notification signal NS2 is to warn an operator to allow the latter to intervene and remove the residues of service fabric and/or adhesive tape from the second surface 10b of the semifinished product 10.

Just like the first notification signal NS1, also the second notification signal NS2 may be directly generated by the second processing unit 180, or it may be generated by a second external device ED2 with which the second processing unit 180 cooperates. In particular, the second processing unit 180 may supply to said second external device ED2 the information about the fact that at least one of the second operative parameters PB1-PBn is smaller than the fourth threshold TH4; the second external device ED2 will then take care of generating the second notification signal NS2.

Preferably, the first and second external devices ED1, ED2 are formed as a single apparatus, e.g. a PLC, as previously mentioned.

Preferably, the second processing unit 180 is configured for causing the generation of a second interruption signal XS2 for deactivating one or more of the actuators 40, so as to temporarily interrupt the unwinding and/or the movement of the semifinished product 10 and allow/facilitate the operator to take appropriate action.

Also the second interruption signal XS2 may be directly generated by the second processing unit 180, or it may be generated by the second external device ED2 upon suitable input from the second processing unit 180.

In the preferred embodiment, after having received the information about the fact that at least one of the second operative parameters PB1-PBn is smaller than the fourth threshold TH4, the second external device ED2 will generate both the second notification signal N2 and the second interruption signal XS2.

Preferably, in the second image B, each one of the second sub-parts ZB1-ZBn is partially superimposed, in one or more respective superimposition areas, on one or more of the second sub-parts adjacent thereto.

Preferably, each second sub-part ZB1-ZBn is partially superimposed on all the second sub-parts adjacent thereto.

Figure 5B:
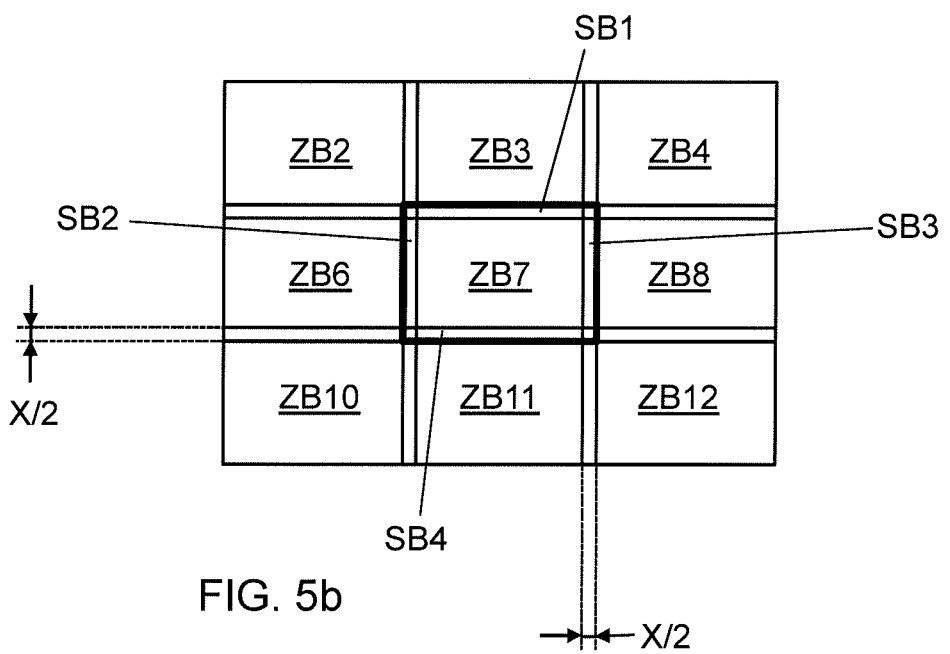

Let us consider, by way of example, the second sub-part ZB7 in FIG. 5b: it is superimposed, to a certain extent, on the second sub-parts ZB3, ZB6, ZB8, ZB11 adjacent thereto, respectively in the superimposition areas SB1, SB2, SB3, SB4.

Preferably, the superimposition extent is determined in such a way that a dimension of said superimposition areas is substantially greater than or equal to about half a dimension of a minimum area element to be detected.

As aforesaid, the second sub-parts ZB1-ZBn are preferably substantially square or rectangular.

The superimposition areas will therefore be, for example, substantially rectangular.

If we imagine to approximate the minimum area element that must be detected (i.e. service fabric residue, foreign body, defect, etc.) as a square having a diagonal X or a circle having a diameter X, the superimposition area between two second sub-parts may be a rectangle, the dimensions of which will be the length of the side of one sub-part comprised within the area of the adjacent sub-part, and X/2.

In this manner it will be possible to correctly detect any undesired elements across adjacent sub-parts, which might otherwise not be detected.

Preferably, the apparatus 1 further comprises a second emitter device 190 positioned on the same side of the semifinished product 10 as the second detection device 130.

As schematically shown in FIG. 1, the second emitter device 190 faces towards the second surface 10b of the semifinished product 10.

The second emitter device 190 is configured for sending an electromagnetic radiation onto at least the semifinished product 10 in order to allow or promote the detection by said second detection device 130.

Preferably, the radiation emitted by the second emitter device 190 is a luminous radiation in the visible range, e.g. obtained through one or more appropriately configured and powered LEDs.

By way of example, the second emitter device 190 may be of the crown type; the sensor of the second detection device 130 may advantageously be positioned in a central area of said crown. In practice, the second emitter device 190 may have a conformation which is wholly similar to that schematically shown in FIG. 8 with reference to the first emitter device 170. Preferably, the second emitter device 190 has structural and functional characteristics substantially identical to those of the first emitter device 170.

Preferably, in order to maximize the quality of the detection carried out by the second detection device 130, the apparatus 1 comprises at least one second background wall 140 positioned on the opposite side of the semifinished product 10 with respect to the second detection device 130. In other words, the semifinished product 10 is interposed between the second detection device 130 and the second background wall 140.

The task of the second background wall 140 is to improve the reliability of the detection of the second image B and the next processing aimed at identifying any defects and/or service fabric residues and/or foreign bodies; in particular, the second background wall 140 is such that the portions BX of the second image B that reproduce the second background wall 140 will be associated with brightness values smaller than the third threshold TH3.

It will thus be possible, as already said with reference to the first background wall 120, to properly detect even any fabric residues having only a small part in contact with the semifinished product and protruding laterally therefrom. Thanks to the contrast provided by the dark colour of the second background wall 140, such residues can be appropriately identified.

Furthermore, the fact that the second background wall 140 is of a dark colour prevents small variations in the width of the semifinished product 10 from interfering with the correct computation of the amplitude of the "bright" portions in the detected images.

Preferably, the second background wall 140 is used for defining the above-mentioned second reference image BRef; the latter may in fact also comprise part of the second background wall 140.

In one embodiment, the apparatus 1 may be provided with a suitable alignment system (not shown), which, preferably in cooperation with the above-mentioned one or more rollers, keeps the semifinished product 10 facing towards the first and/or second detection device 110, 130, so that the detection of the first and/or second images A, B and the subsequent analyses can be carried out in an accurate and correct manner.

Note that the first and second processing units 160, 180 have been described separately herein only for the sake of clarity.

In one embodiment, they may be made as a single electronic device, appropriately programmed for carrying out the operations described and claimed herein.

Said single electronic device may consist of or be operationally associated with a PLC, which controls the operation of the apparatus 1 and possibly also of other parts of the plant.

In a different embodiment, the first and second processing units 160, 180 may be made as distinct electronic devices. By way of example, each electronic unit 160, 180 may be partially or wholly integrated into a digital video camera also including at least the respective detection device 110, 130.

In practical terms, this typology of video camera may be so structured and programmed as to output at least information about the fact that at least one first operative parameter PA1-PAn and/or at least one second operative parameter PB1-PBn is smaller than the respective second/fourth threshold TH2, TH4. This information, which is conveniently supplied to the first/second external device ED1, ED2, will then allow the generation of the first/second notification signals NS1, NS2 and possibly of the first/second interruption signals XS1, XS2. As aforesaid, the first external device ED1 and the second external device ED2 may consist of a single device/apparatus, preferably integrated into the above-mentioned PLC.

In the light of the above, in accordance with the present invention the following operations are carried out.

First of all, the first image A is detected.

The first image is divided into a plurality of first sub-parts ZA1-ZAn.

For each first sub-part ZA1-ZAn, a first comparison is then made between the brightness values of the respective first portions A1, A2 and the first threshold TH1.

As a function of said first comparison, for each first sub-part ZA1-ZAn the first operative parameter PA1-PAn is determined, which is representative of the total area occupied, in the respective first sub-part ZA1-ZAn, by the first portions A1 associated with a brightness value smaller or greater than the first threshold TH1, preferably smaller than the first threshold TH1.

A second comparison is then made between each first operative parameter PA1-PAn and the second threshold TH2.

The first notification signal NS1 will be generated as a function of said second comparison. Preferably, the first notification signal NS1 will be generated if one or more of the first operative parameters PA1-PAn is smaller than the second threshold TH2.

Preferably, the first interruption signal XS1 will also be generated if one or more of the first operative parameters PA1-PAn is smaller than the second threshold TH2.

Preferably, for the purpose of allowing or promoting the detection of the first image A, an electromagnetic radiation is sent onto the semifinished product 10, e.g. having a wavelength within the visible radiation range.

Preferably, the above-mentioned first background wall 120 is so arranged that the semifinished product 10 will be interposed between said first background wall 120 and the first detection device 110 used for detecting the first image A.

Preferably, the second image B representative of the semifinished product 10 may also be detected.

The second image B is divided into a plurality of second sub-parts ZB1-ZBn.

For each second sub-part ZB1-ZBn, a third comparison is then made between the brightness values of the respective second portions B1, B2 and the third threshold TH3.

As a function of said third comparison, for each second sub-part the second operative parameter PB1-PBn is determined, which is representative of the total area occupied, in the respective second sub-part ZB1-ZBn, by the second portions B1 associated with a brightness value smaller or greater than the third threshold TH3, preferably smaller than the third threshold TH3.

A fourth comparison is then made between each second operative parameter PB1-PBn and the fourth threshold TH4.

The second notification signal NS2 will be generated as a function of said fourth comparison. Preferably, the second notification signal NS2 will be generated if one or more of the second operative parameters PB1-PBn is smaller than the fourth threshold TH4.

Furthermore, the second interruption signal XS2 will also be generated if one or more of the second operative parameters PB1-PBn is smaller than the fourth threshold TH4.

Preferably, for the purpose of allowing or promoting the detection of the second image B, an electromagnetic radiation is sent onto the semifinished product 10, e.g. having a wavelength within the visible radiation range.

Preferably, the above-mentioned second background wall 140 is so arranged that the semifinished product 10 will be interposed between said second background wall 140 and the second detection device 130 used for detecting the second image B.

Note that reference has been made so far to just one first image A and just one second image B, respectively representing a portion of the first and second surfaces 10a, 10b of the semifinished product 10. The invention provides, however, for detecting a succession of first images and, preferably, a succession of second images B, in order to completely examine the semifinished product 10. In particular, the detection of the first images A and, preferably, of the second images B, is set also according to the feeding/sliding speed of the semifinished product 10, so as to avoid that some parts of the semifinished product 10 might not be included in the first and/or second images A, B and might not be analyzed in accordance with the invention.

By way of example, the first and/or second detection devices 110, 130 may use an exposition time comprised between about 0.95 ms and about 1.05 ms. The average processing time for each image is comprised between about 8 ms and 12 ms. The sliding speed of the semifinished product 10 may be comprised between about 1.5 m/s and about 2.5 m/s.

Assuming a processing time of 11 ms, it will be possible to process 90.9 images per second; assuming a sliding speed of 2 m/s, the distance between the video camera and the semifinished product will have to be adjusted in such a way that the length of semifinished product 10 included in each image will be about 22 mm. The distance between the video camera and the semifinished product also depends on the focal length of the lens in use. If the lens is changed, the distance of the video camera will have to be adjusted in such a way that the framed length of semifinished product will still be 22 mm.

By setting the system differently, e.g. for a sliding speed of about 1.8 m/s, it will be possible, the other parameters being equal, to adjust the distance of the video camera for framing an image of about 20 mm.

The invention claimed is:

1. A method for controlling production and feeding of semifinished products in a tyre building process, comprising:
    detecting at least one first image representative of a semifinished product, wherein said first image is detected by a first detection device facing toward said semifinished product and providing a first background wall on an opposite side of said semifinished product with respect to said first detection device;
    dividing said at least one first image into a plurality of first sub-parts, wherein each one of said first sub-parts comprises a plurality of first portions, each one associated with a respective brightness value;
    defining a first threshold for said brightness values;
    making a first comparison between the brightness values of said first portions and said first threshold;
    as a function of said first comparison, determining for each one of said first sub-parts a first operative parameter representative of a total area occupied in each first sub-part by the first portions associated with a brightness value smaller or greater than said first threshold;
    making a second comparison between each one of said first operative parameters and a second threshold; and
    causing generation of a first notification signal as a function of said second comparison.

2. The method according to claim 1, wherein, a first linear scale of brightness values is provided, which is defined between a first value corresponding to a null brightness value and a second value corresponding to a maximum brightness value, wherein an absolute value of a difference between said first value and said second value defines an amplitude of said first linear scale, and said first threshold is defined in relation to said first linear scale.

3. The method according to claim 2, wherein said first threshold is such that an absolute value of a difference between said first threshold and said first value is between about 5% and about 20% of an amplitude of said first linear scale.

4. The method according to claim 1, wherein each first operative parameter is representative of a total area occupied in a respective first sub-part by the first portions associated with a brightness value smaller than said first threshold.

5. The method according to claim 1, wherein said first notification signal is generated if one or more of said first operative parameters are smaller than said second threshold.

6. The method according to claim 1, wherein said first image is a monochromatic image.

7. The method according to claim 1, wherein said at least one first image is detected as said semifinished product and is unwound from a reel and moved toward a building station for building elementary semifinished products, made by starting from said semifinished product.

8. The method according to claim 7, comprising causing generation of, if one or more of said first operative parameters are smaller than said second threshold, a first interruption signal for deactivating one or more actuators that promote unwinding of said semifinished product from said reel and/or movement thereof toward said building station.

9. The method according to claim 1, comprising:
providing a first reference image representative of at least one portion of semifinished product with substantially no residues or foreign bodies, said first reference image being composed of a plurality of first reference portions, each first reference portion associated with a respective brightness value;
comparing the brightness values of said first reference portions with said first threshold;
determining a first reference parameter representative of a total area occupied in said first reference image by first reference portions associated with a brightness value smaller than said first threshold; and
determining said second threshold as a function of said first reference parameter.

10. The method according to claim 9, wherein providing said first reference image comprises detecting an image of said semifinished product in a portion thereof with substantially no residues or foreign bodies.

11. The method according to claim 1, comprising sending an electromagnetic radiation onto at least said semifinished product in order to allow or promote detection by said first detection device.

12. The method according to claim 1, wherein said first background wall is such that portion/s of said first image reproducing said first background wall is/are associated with brightness values that are smaller than said first threshold.

13. The method according to claim 1, comprising:
providing a first reference image representative of at least one portion of semifinished product with substantially no residues or foreign bodies, said first reference image being composed of a plurality of first reference portions, each first reference portion associated with a respective brightness value;
comparing the brightness values of said first reference portions with said first threshold;
determining a first reference parameter representative of a total area occupied in said first reference image by first reference portions associated with a brightness value smaller than said first threshold; and
determining said second threshold as a function of said first reference parameter, wherein providing said first reference image comprises detecting at least one portion of said first background wall.

14. The method according to claim 1, wherein said first image is representative of a portion of a first surface of said semifinished product, comprising:
detecting a second image representative of a portion of a second surface of said semifinished product which is opposite to said first surface;
dividing said second image into a plurality of second sub-parts, each one of said second sub-parts being formed by a plurality of second portions, each of said second portions associated with a respective brightness value;
defining a third threshold for said brightness values;
making a third comparison between brightness values of said second portions and said third threshold;
as a function of said third comparison, determining for each of said second sub-parts a second operative parameter representative of a total area occupied in each second sub-part by the second portions associated with a brightness value smaller or greater than said third threshold;
making a fourth comparison between each one of said second operative parameters and a fourth threshold; and
causing the generation of a second notification signal as a function of said fourth comparison.

15. The method according to claim 14, wherein, a second linear scale of brightness values is provided, which is defined between a third value corresponding to a null brightness value and a fourth value corresponding to a maximum brightness value, wherein an absolute value of a difference between said third value and said fourth value defines an amplitude of said second linear scale, said third threshold being defined in relation to said second linear scale.

16. The method according to claim 15, wherein said third threshold is such that the absolute value of the difference between said third threshold and said third value is between about 5% and about 20% of an amplitude of said second linear scale.

17. The method according to claim 14, wherein each second operative parameter is representative of a total area occupied in a respective second subpart by the second portions associated with a brightness value smaller than said third threshold.

18. The method according to claim 17, wherein said second notification signal is generated if one or more of said second operative parameters are smaller than said fourth threshold.

19. The method according to claim 14, comprising causing the generation of, if one or more of said second operative parameters are smaller than said fourth threshold, a second interruption signal for deactivating one or more actuators that promote the unwinding of said semifinished product from said reel and/or the movement thereof toward said building station.

20. The method according to claim 14, wherein said first image is detected by a first detection device facing toward said semifinished product, and wherein said first detection device faces toward the first surface of said semifinished product.

21. The method according to claim 14, wherein said at least one first image is detected as said semifinished product unwound from a reel and moved toward a building station for building elementary semifinished products, made by starting from said semifinished product, and wherein said semifinished product, as it is unwound from said reel and moved toward said building station, follows a predetermined path, said first image and said second image being detected in different positions along said path.

22. The method according to claim 14, wherein said second image is detected by a second detection device facing toward the second surface of said semifinished product.

23. The method according to claim 22, comprising sending an electromagnetic radiation onto at least said semifinished product in order to allow or promote detection by said second detection device.

24. The method according to claim 22, comprising providing a second background wall on an opposite side of said semifinished product with respect to said second detection device.

25. The method according to claim 24, wherein said second background wall is such that portion/s of said second image reproducing said second background wall is/are associated with brightness values that are smaller than said third threshold.

26. The method according to claim 14, wherein said third threshold is substantially equal to said first threshold.

27. The method according to claim 14, wherein said second threshold is substantially equal to said fourth threshold.

28. The method according to claim 1, wherein each one of said first sub-parts is partially superimposed, in one or more respective superimposition areas, on one or more of the first sub-parts adjacent thereto.

29. The method according to claim 28, wherein a dimension of said superimposition areas is substantially greater than or equal to about half a dimension of a minimum area element to be detected.

30. An apparatus to control manufacturing and feeding of semifinished products in a tyre building process, comprising:
   at least one first detection device for detecting at least one first image representative of a semifinished product;
   at least one first memory;
   at least one first processing unit associated with said first detection device and with said first memory, and configured for:
      i. dividing said at least one first image into a plurality of first sub-parts, wherein each one of said first sub-parts is formed by a plurality of first portions, each first portion associated with a respective brightness value;
      ii. making a first comparison between brightness values of said first portions and a first threshold stored in said first memory and concerning said brightness values;
      iii. as a function of said first comparison, determining for each one of said first sub-parts a first operative parameter representative of a total area occupied in each first sub-part by the first portions associated with a brightness value smaller or greater than said first threshold;
      iv. making a second comparison between each one of said first operative parameters and a second threshold; and
      v. causing generation of a first notification signal as a function of said second comparison; and
   a first background wall positioned on an opposite side of said semifinished product with respect to said first detection device.

31. The apparatus according to claim 30, wherein, a first linear scale of brightness values is provided, which is defined between a first value corresponding to a null brightness value and a second value corresponding to a maximum brightness value, wherein an absolute value of a difference between said first value and said second value defines an amplitude of said first linear scale, and said first threshold is defined in relation to said first linear scale.

32. The apparatus according to claim 31, wherein said first threshold is such that the absolute value of the difference between said first threshold and said first value is between about 5% and about 20% of an amplitude of said first linear scale.

33. The apparatus according to claim 30, wherein each first operative parameter is representative of a total area occupied in a respective first sub-part by the first portions associated with a brightness value smaller than said first threshold.

34. The apparatus according to claim 31, wherein said first notification signal is generated if one or more of said first operative parameters are smaller than said second threshold.

35. The apparatus according to claim 30, wherein said at least one first image is detected as said semifinished product is unwound from a reel and moved toward a building station for building elementary semifinished products, made by starting from said semifinished product.

36. The apparatus according to claim 35, wherein said first processing unit is configured for causing the generation of, if one or more of said first operative parameters are smaller than said second threshold, a first interruption signal for deactivating one or more actuators that promote the unwinding of said semifinished product from said reel and/or movement thereof toward said building station.

37. The apparatus according to claim 30, comprising a first emitter device positioned on a same side of said semifinished product as said first detection device and configured for sending an electromagnetic radiation onto at least said semifinished product in order to allow or promote detection by said first detection device.

38. The apparatus according to claim 30, wherein said first background wall is such that portion/s of said first image reproducing said first background wall is/are associated with brightness values that are smaller than said first threshold.

39. The apparatus according to claim 30, wherein said first detection device faces toward a first surface of said semifinished product, comprising:
   a second detection device facing toward a second surface of said semifinished product which is opposite to said first surface, said second detection device being adapted to detect a second image representative of a portion of the second surface of said semifinished product;
   a second memory;
   a second processing unit associated with said second detection element and configured for:
      i. dividing said second image into a plurality of second sub-parts, each one of said second sub-parts being formed by a plurality of second portions, each second portion associated with a respective brightness value;
      ii. making a third comparison between brightness values of said second portions and a third threshold stored in said second memory and concerning said brightness values;
      iii. as a function of said third comparison, determining for each one of said second subparts a second operative parameter representative of a total area occupied in each second sub-part by the second portions associated with a brightness value smaller or greater than said third threshold;
      iv. making a fourth comparison between each one of said second operative parameters and a fourth threshold; and
      v. causing generation of a second notification signal as a function of said fourth comparison.

40. The apparatus according to claim 39, wherein, a second linear scale of brightness values is provided, which is defined between a third value corresponding to a null brightness value and a fourth value corresponding to a maximum brightness value, wherein an absolute value of a difference between said third value and said fourth value defines an amplitude of said second linear scale, and said third threshold is defined in relation to said second linear scale.

41. The apparatus according to claim 40, wherein said third threshold is such that the absolute value of the difference between said third threshold and said third value is between about 5% and about 20% of an amplitude of said second linear scale.

42. The apparatus according to claim 39, wherein each second operative parameter is representative of a total area occupied in a respective second subpart by the second portions associated with a brightness value smaller than said third threshold.

43. The apparatus according to claim 39, wherein said second notification signal is generated if one or more of said second operative parameters are smaller than said fourth threshold.

44. The apparatus according to claim 39, comprising a first emitter device positioned on a same side of said semifinished product as said first detection device and configured for sending an electromagnetic radiation onto at least said semifinished product in order to allow or promote detection by said first detection device, wherein said first emitter device faces toward the first surface of said semifinished product.

45. The apparatus according to claim 39, wherein said second processing unit is configured for causing generation of, if one or more of said second operative parameters are smaller than said fourth threshold, a second interruption signal for deactivating one or more actuators that promote unwinding of said semifinished product from said reel and/or movement thereof toward said building station.

46. The apparatus according to claim 39, wherein said at least one first image is detected as said semifinished product is unwound from a reel and moved toward a building station for building elementary semifinished products, made by starting from said semifinished product, and wherein said first and second detection devices are located in different positions along a path that is followed by said semifinished product as it is unwound from said reel and moved toward said building station.

47. The apparatus according to claim 39, comprising a second background wall positioned on an opposite side of said semifinished product with respect to said second detection device.

48. The apparatus according to claim 47, wherein said second background wall is such that portion/s of said second image reproducing said second background wall is/are associated with brightness values that are smaller than said third threshold.

49. The apparatus according to claim 39, comprising a second emitter device positioned on a same side of said semifinished product as said second detection device and configured for sending an electromagnetic radiation onto at least said semifinished product in order to allow or promote detection by said second detection device.

* * * * *